(No Model.)

W. T. REASER.
BALANCED SLIDE VALVE.

No. 273,891. Patented Mar. 13, 1883.

WITNESSES:
Fred. G. Dieterich
Charles H. Baker

INVENTOR.
W. T. Reaser
per DeWitt C. Allen
ATTORNEY.

United States Patent Office.

WARREN T. REASER, OF MADISON, WISCONSIN.

BALANCED SLIDE-VALVE.

SPECIFICATION forming part of Letters Patent No. 273,891, dated March 13, 1883.

Application filed May 23, 1882. (No model.)

*To all whom it may concern:*

Be it known that I, WARREN T. REASER, a citizen of the United States, residing at Madison, in the county of Dane and State of Wisconsin, have invented certain new and useful Improvements in Balanced Slide-Valves; and I do hereby declare the following to be a full, clear, and exact description of the invention, such as will enable others skilled in the art to which it appertains to make and use the same.

This invention relates to certain new and useful improvements in means especially designed for lessening or removing the friction between a slide-valve and its seat, resulting from the downward pressure upon such valves of steam or other fluids, or to produce a more perfect and complete "balanced slide-valve;" and to this end the invention consists in novel features of construction, and combination, and arrangement of parts, all as will be hereinafter fully described, and set forth in the claims hereto annexed.

Figure 1:
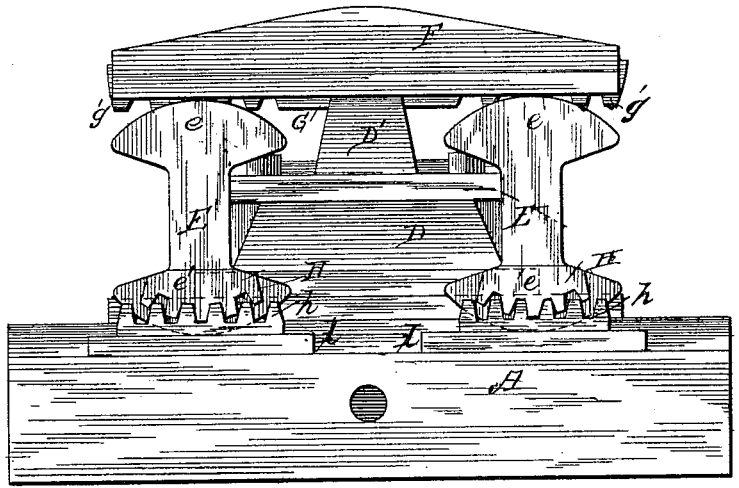
Figure 2:
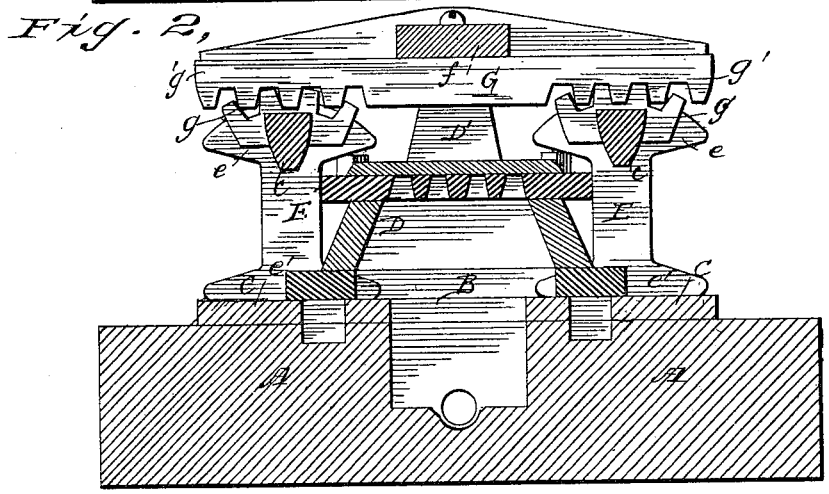
Figure 3:
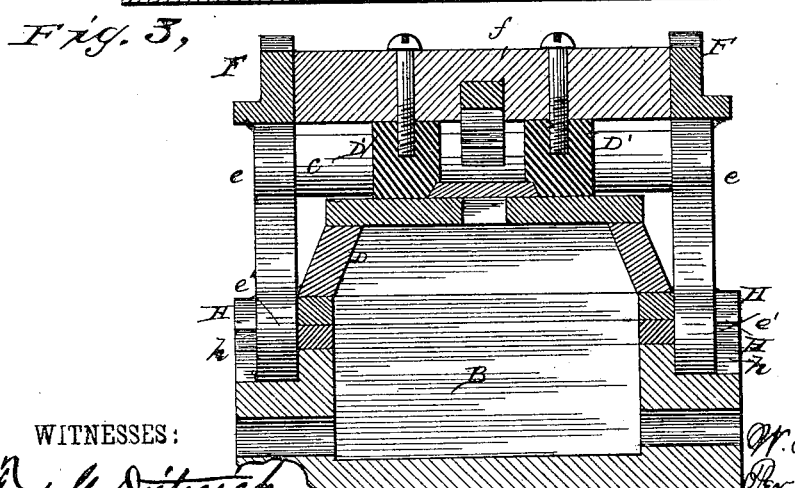

Referring to the accompanying drawings, Figure 1 is a side elevation; Fig. 2, a longitudinal vertical central section; Fig. 3, a central cross-section.

In the drawings, A represents the upper portion of a cylinder, B the steam-chest, C the valve-seat, and D the slide-valve, of a steam-engine.

E E represent vibrating supports for carrying the valves, which supports are provided at their upper and lower ends with segmental or rocking bearings e e'. Upon the bearings e rest horizontal plates F F, connected by a cross-bar, f, secured to vertical supports D' D', projecting from the top of the valve D, all as clearly shown in Fig. 1. The bearing-supports E E are arranged on opposite sides of the valve D, and connected, near their upper ends, by cross bars or rods c c. These cross bars or rods are provided with toothed segments g g, which mesh with the cog-teeth g', or the projecting ends of a rod or bar, G, secured to the cross-bar f, and which rod or bar G may form the means for operating the valve. The lower bearings, e' e', are provided on their outer sides with toothed segments H H, which mesh with the toothed bars h h, secured to the horizontal plates I I, that are adapted to be vertically adjusted by liners for raising or lowering the valve. The toothed segments and toothed bars always insure a uniform movement or working of the valve, while retaining it in its proper position relative to the valve-seat. By having the segmental or rocking bearings at the upper and lower ends of the vibrating valve-supports, the valve works much easier as the bearings move along with and carry the valve, thus requiring less power, while lessening, to a great extent, friction between slide-valves and their seats.

The above-described construction is also applicable to the class of steam-engines having double valves.

I am aware that geared rollers with plain anti-friction surfaces adapted to mesh with rack-bars arranged above and below said geared rollers, for lessening or removing the friction between a slide-valve and its seat, is old, and such I distinctly disclaim as of my invention.

Having thus fully described my invention, what I claim as new, and desire to secure by Letters Patent, is—

1. The combination, with a slide-valve and its valve-seat, of vibrating supports having segmental or rocking bearings at their upper and lower ends, arranged outside of and on opposite sides of the slide-valve, and adapted to move along with the valve, substantially in the manner as and for the purpose herein shown and described.

2. The combination, with a slide-valve and its valve-seat, of vibrating supports having segmental or rocking bearings at their upper and lower ends, arranged outside of and on opposite sides of the slide valve, and the adjustable supporting-plates I I, substantially in the manner as and for the purpose herein shown and described.

3. The combination, with a slide-valve and its valve-seat, of vibrating supports having segmental or rocking bearings at their upper and lower ends, arranged outside of and on opposite sides of the slide-valve, toothed segments H H, connected thereto, and the toothed bars h h, substantially in the manner as and for the purpose herein shown and described.

4. The combination, with a slide-valve and its valve-seat, of vibrating supports having segmental or rocking bearings at their upper and lower ends, arranged outside of and on opposite sides of the slide-valve, toothed segments H H, connected thereto, toothed bars $h\ h$, cross-bars $c\ c$, having toothed segments $g\ g$, and rod or bar G, having cog-teeth at its opposite ends, and connected to the valve, substantially in the manner as and for the purpose herein shown and described.

In testimony whereof I affix my signature in presence of two witnesses.

WARREN T. REASER.

Witnesses:
 E. A. HAYES,
 J. O. HAYES.